3,170,238
METHOD AND APPARATUS FOR THE PHOTO-
GRAMMETRIC PLOTTING OF ASSOCIATED
AERIAL PHOTOGRAPHS IN PAIRS
Henk Yzerman, Aarau, Switzerland
Filed Sept. 14, 1960, Ser. No. 55,961
Claims priority, application Switzerland, Sept. 17, 1959,
78,350
2 Claims. (Cl. 33—20)

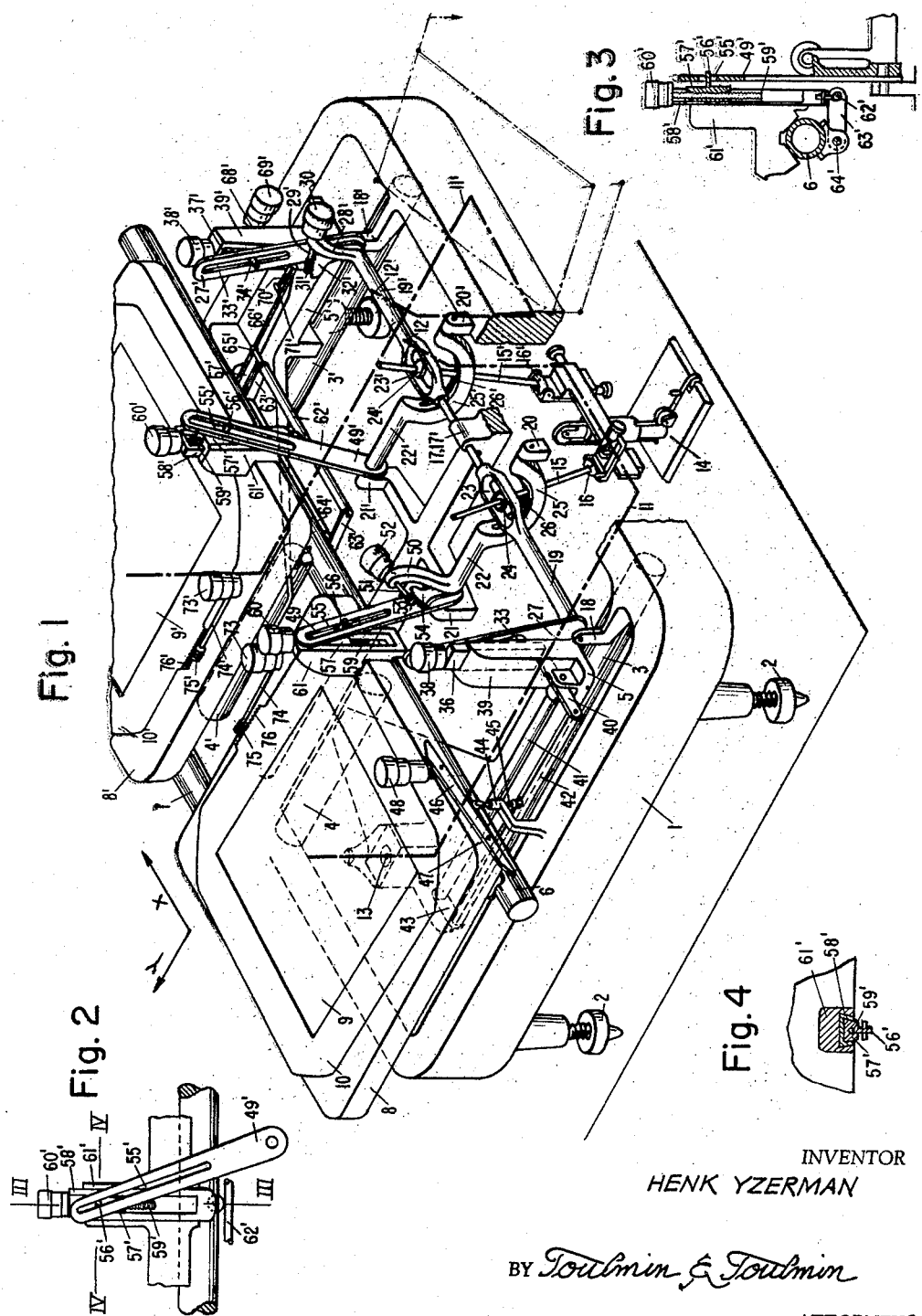
Feb. 23, 1965     H. YZERMAN     3,170,238
METHOD AND APPARATUS FOR THE PHOTOGRAMMETRIC PLOTTING
OF ASSOCIATED AERIAL PHOTOGRAPHS IN PAIRS
Filed Sept. 14, 1960
INVENTOR
HENK YZERMAN
BY *Toulmin & Toulmin*
ATTORNEYS

United States Patent Office 3,170,238
Patented Feb. 23, 1965

The invention relates to a method for the photogrammetric plotting of associated aerial photographs in pairs, and photogrammetric plotting apparatus for carrying out this method.

In the photogrammetric plotting of stereometrically associated aerial photographs, it is generally necessary for such aerial photographs to be corrected. It is particularly necessary for pairs of photographs disposed in parallel planes (X, Y) to be corrected, since deviations are to be expected and thus to be allowed for. Two groups of deviations or aberrations can be distinguished.

The first group comprises the following deviations:

(a) The radial deviations between the central and the orthogonal projections of the uneven terrain on a plane;

(b) The y-parallaxes which are produced in the usual wide-angle almost perpendicular photographs of $\Delta\omega$ surveys, and which are several times greater than the corresponding y-parallaxes, and the x-parallaxes which are produced by $\Delta y$, and which are several times greater than the corresponding y-parallaxes, if $\Delta y$ is the angle of inclination of the axis of survey in the direction of $x$, and $\Delta\omega$ is the angle of inclination of the axis of survey in the direction of $y$.

(c) The difference between the longitudinal and transverse shrinkages of films, and particularly of the paper prints produced therefrom.

The second group of these deviations comprises the x-parallaxes referred to, produced by $\Delta\omega$, and the y-parallaxes produced by $\Delta y$.

In two ideal cases, that is to say, in those cases in which the azimuth of the nadir distance is either parallel or at right angles to the base of survey, a geometrically satisfactory correction can be obtained by dividing the relative movements between the aerial photographs and the measuring marks into rectilinear movements ($x_1$, $y_1$ and $x_2$, $y_2$) disposed at right angles to each other, for each of the two aerial photographs. The correction is then effected mechanically in two steps, the largest deviations, that is to say, the deviations of the first of the two groups referred to, being removed in the first step, and the smaller deviations mentioned in the second group being eliminated in the second step.

The present invention relates to a method for the photogrammetric plotting of stereometrically associated aerial photographs in pairs in which the relative movements between the aerial photograms and their associated measuring marks are divided into two rectilinear movements ($x_1$, $y_1$ and $x_2$, $y_2$) disposed at right angles to each other, for each of the two aerial photographs, the characterizing feature of this method being that, upon the correction, the plane of projection is tilted through the angles $\Delta\omega_1$ and $\Delta y_2$ or through the angles $\Delta\omega_1$ and $\Delta y_2$ with respect to the reference plane from which the components of the distortion-correcting angles $\Delta y_1$ and $\Delta\omega_2$ or $\Delta\omega_1$ and $\Delta y_1$ are introduced.

The two ideal cases hereinbefore referred to can always be realized by virtue of the fact that the reference plane from which the components of the distortion-correcting angles $\Delta y_1$ and $\Delta\omega_2$ or $\Delta\omega_1$ and $\Delta y_1$ are introduced, is tilted through the angles $\Delta\omega_1$ and $\Delta y_2$ or $\Delta y_1$ and $\Delta\omega_2$ with respect to the plane of projection, for the angles of inclination of the aerial photographs with respect to a plane which has already been tilted through the angles $\Delta y_1$ and $\Delta\omega_2$ or $\Delta\omega_1$ and $\Delta y_2$ amount to $\Delta\omega_1 - \Delta\omega_2$ or $\Delta y_1 - \Delta y_2$ for the first aerial photograph, and to $\Delta y_2 - \Delta y_1$ or $\Delta\omega_2 - \Delta\omega_1$ for the second aerial photograph. In both cases, therefore, the azimuth is disposed either parallel or at right angles to the base of survey. The first and second steps of mechanical correction for $\Delta y_1$ and $\Delta\omega_2$ or $\Delta\omega_1$ and $\Delta y_2$ can thus be dispensed with.

Furthermore, the invention relates to photogrammetric plotting apparatus for carrying out the method of the invention, in which the relative movements between the aerial photographs and their associated measuring marks are divided into two rectilinear movements which are disposed at right angles to each other, for each of the two aerial photographs, and which is characterized in that each half of the apparatus is provided with at least one stereoscopic model guide, by which deviations occurring during the plotting of aerial photographs are transmitted as independent rotational movements to two shafts which intersect at right angles, a lever being secured to each shaft, and the angular position of at least one of these levers with respect to its associated stereoscopic model guide being adjustable prior to the plotting operation, the rotational movements of the said shafts being transmitted by the said levers independently of one another in the form of relative movements between the carriers of the aerial photographs and their associated carriers of the measuring marks in the directions of $x$ and $y$, and the effective length of each lever being adjustable prior to the plotting operation.

Each half of the plotting apparatus may be provided with a single stereoscopic model guide. It is, however, possible for the stereoscopic model guide of each half of the instrument to be divided into two levers.

The stereoscopic model guides are used for the transformation of the central projection into the orthogonal projection, the deviations referred to under (a) of the first group being thus allowed for. Upon translation of the rotational movements of the shafts disposed at right angles to each other, caused by the stereoscopic model guide or guides, into displacements of the carriers of the aerial photographs in the direction of $x$, and of the carrier of the measuring marks in the direction of $y$ respectively, the y-parallaxes produced by $\Delta\omega$ and the x-parallaxes produced by $\Delta y$ can be eliminated by adjusting the angular positions of the levers by which such displacements are transmitted. The deviations referred to under (b) of the first group are thus allowed for. Since, upon introduction of the principal distances, the adjustment of the effective length of the lever arms by which the carriers of the aerial photographs and the carriers of the measuring marks are displaced, is effected for each lever separately, the difference between the longitudinal and transverse shrinkages of films and paper prints produced therefrom, can be equalized, so that the deviations referred to under (c) of the first group are allowed for. Thus, all deviations included in the first group can be allowed for with the aid of this first step of mechanical correction. All of the deviations included in the group hereinbefore referred to can thus be corrected. The deviations included in the second group, that is the x-parallaxes caused by $\Delta\omega$ and the y-parallaxes caused by $\Delta y$ can be eliminated by additional linear variations of the effective lengths of the lever arms of the levers referred to. The lengths of the lever arms may be varied by means of straight guide rails and control elements guided thereon. This is the second mechanical correction step.

Furthermore in the photogrammetric plotting of single photographs, it is by all means also possible for only one half of the apparatus to be used as mechanical rectifier.

One construction of the photogrammetric plotting apparatus for carrying out the method of the invention, and a detail thereof, are illustrated by way of example in the drawings, in which:

FIGURE 1 is a diagrammatic representation of the photogrammetric plotting apparatus;

FIGURE 2 is an elevation of a detail of this plotting apparatus;

FIGURE 3 is a section on the line III—III of FIGURE 2, and

FIGURE 4 is a section on the line IV—IV of FIGURE 2.

The photogrammetric plotting apparatus illustrated in FIGURE 1 has a solid rectangular box frame 1 which is mounted on a plane of projection and/or plotting, its position in a vertical sense, and its angle of inclination being adjusted by means of three vertically adjustable screw legs 2. Prior to the plotting of a pair of photographs, the box frame 1 is tilted by means of the said screw legs 2 towards the plane of projection it being, in principle, immaterial whether the plane of projection and/or plotting is horizontal and the box frame 1 is tilted at an angle, or inversely. The heavy box frame 1, on which the sliding carriages hereinafter described are to be displaced is, however, advantageously horizontal, the plane of projection and/or plotting being tilted. Inserted securely in the box frame 1 are two pairs of guide rods 3, 4 and 3', 4' which respectively extend parallel to the side parts of the box frame. Sliding carriages 5 and 5' are respectively displaceable on each pair of guide rods 3, 4 and 3', 4', the sliding carriages 5 and 5' being displaceable in the direction of y independently of each other. Mounted securely on the box frame 1 are two guide rods 6 and 7 which respectively extend at right angles to the guide rods 3, 4 and 3', 4', that is to say, in the direction of x, two frame-like sliding carriages 8 and 8' being mounted on the guide rods 6 and 7 so as to be displaceable independently of each other. The sliding carriages 8 and 8' respectively serve as carriers of one of two stereometrically associated aerial photographs 9 and 9', which are respectively held in position in frames 10 and 10' which are inserted in the frame-like sliding carriages 8 and 8' respectively, in which they are held firmly in position so as to be immovable, but rotatable. The plotting apparatus is provided with a stereoscope of which only the paths 11 and 11' of the rays of the two halves of the stereoscope are shown in dash-and-dot lines. The eyepieces 12 and 12' of the stereoscope are provided at the front of the plotting apparatus, and the parts on the lens side of the stereoscope, which parts contain the measuring marks 13, are adapted to be movable, and are respectively secured to the sliding carriages 5 and 5' in such manner that they can be moved by the sliding carriages 5 and 5' in the direction of y, independently of each other. The plotting apparatus illustrated has a model space point (Modellraumpunkt) which, as is generally known, is constructed as a base carriage 14. The photogrammetric functions of the base carriage 14 are generally known and thus require no further description.

Mounted on the base carriage 14 in universal joints 16 and 16' are stereoscopic model guides 15 and 15', one being provided for each of the two essentially symmetrical halves of the plotting apparatus. The universal joints 16 and 16' can be adjusted relatively to each other in known manner in any optional position which corresponds to the survey of the aerial photographs 9, 9'.

It is the left-hand half of the plotting apparatus illustrated in FIGURE 1 which is now described first. A shaft 19, extending parallel to the plane of the box frame 1 in the direction of x is mounted in supports 17 and 18 which are connected securely to the box frame 1, a shaft 22 extending in the direction of y being mounted in the supports 20 and 21 which are also mounted securely on the box frame 1. The two shafts 19 and 22 are disposed in the same plane. At the position of intersection with the shaft 22, the shaft 19 is provided with a wide eyelet 23 in which a rotary part 24 is mounted on a shaft extending at right angles to the shaft 19. The rotary part 24 is provided with a perforation which extends at right angles to its axis, and in which the stereoscopic model guide 15 is displaceably guided. The shaft 22 has a semi-circular curved part 25 with which it moves around the position of intersection with the shaft 19, the semi-circular curved part being provided with a slot 26 which extends in the axial direction and in which the stereoscopic model guide 15 is guided. The axes of the shafts 19 and 22 and the axis of the stereoscopic model guide 15 intersect at a position on the shaft of the rotary part 24. This Cardanic guidance of the stereoscopic model guide 15 has the result that, upon displacement of the base carriage 14 in the direction of x, the stereoscopic model guide 15 turns the shaft 22 extending in the direction of y, while the shaft 19 extending in the direction of x remains unaffected, and that upon displacement of the base carriage 14 in the direction of y, the stereoscopic model guide 15 turns the shaft 19 extending in the direction of x, and the shaft 22 extending in the direction of y remains stationary. With any other displacement of the base carriage 14, the two shafts 19 and 22 are turned in the directions x and y as determined by components of the displacement carriage.

Mounted at that end of the shaft 19 which is remote from the eyelet 23, is a guide lever 27 which has a guide slot 33 extending in its longitudinal direction, in which there is guided a pin 34 which is secured to a guide member which is vertically slidable in a sliding member 36. In the drawings, these parts are only partially visible, so that the corresponding parts on the right-hand half of the plotting apparatus, which, being of the same construction, carry the same references with the addition of a prime (') should be used by way of reference. The displacement of the guide member in the sliding member 36 is effected by a screw-threaded spindle 37 which is mounted so as to be axially non-displaceable in the sliding member 36 and is screwed into the internal thread provided in the guide member, its upper end being provided with a milled head 38 provided with an adjusting scale which cooperates with an adjusting mark provided on the sliding member 36. The sliding member 36 is displaceable in a vertical slide provided in a support 39 which is mounted on the sliding carriage 5. The lower end of the sliding member 36 is supported by a two-armed lever 40 which is mounted on the front end of a shaft 41 mounted on the sliding carriage 5 and extending in the direction of y. Mounted on the other arm of the lever 40 is the forward end of a guide rod 42 which extends parallel to the shaft 41 and the rear end of which is mounted on a lever 43 provided on the shaft 41, and extending parallel to the lever 40. The lower end of a transmission member 45 slides on the guide rod 42, the upper end of the transmission member being guided on a guide rail 46 extending in the direction of x and guided so as to be vertically slidable in a support 44 mounted on the box frame 1. The guide rail 46 is pivotally mounted on a shaft 47 extending in the direction of y and pivotally mounted at the front of the sliding carriage 8, it being possible for the angle of inclination of the guide rail 46 to be varied by means of an adjusting screw 48 which is provided with a scale and is mounted on the sliding carriage 8.

A guide lever 49 is adjustable on the rear end of the shaft 22 at a position remote from the curved part 25; at this end, the shaft 22 is provided with an arm 50 in which a shaft 51 extending at right angles to the shaft 22 is mounted so as to be non-displaceable in the axial direction. One end of the shaft 51 carries a milled head 52 provided with a scale cooperating with an adjusting mark provided on the arm 50. The other end of the shaft 51 carries a worm 53 which is in engagement with a worm-wheel sector 54 mounted on the guide lever 49 in such manner that the angular position of the guide lever 49 on the shaft 22 can be varied by turning the milled head 52 together with the shaft 51. The guide lever 49 has a longitudinal guide slot 55, in which a pin 56, mounted on a guide member 57 which is displaceable in a support 61 mounted on the sliding carriage 8, is guided. The displacement of the guide member 57 in the support 61 is effected by a screw-threaded spindle 59 which is mounted in the support 61 so as to be non-displaceable in the axial direction, and which is screwed into the internal thread provided in a guide member 57, its upper end carrying a milled head 60 provided with an adjusting scale which cooperates with the adjusting mark provided on the support 61.

As previously stated, the right-hand and left-hand halves of the plotting apparatus illustrated in FIGURE 1 are symmetrical, the numerals used in the right-hand half being the same as those used in the left-hand half except for the addition of a prime ('), the features by which the right-hand half is distinguished from the left-hand half being as follows:

The guide lever 27' is not secured in position on the shaft 19', but is adapted to be rotatable thereon. For this purpose, that part of the shaft 19' which is remote from the eyelet 23' is provided with an arm 28', in which a shaft 29' extending at right angles to the shaft 19' is mounted to be axially non-displaceable, one end of the shaft 29' carrying a milled head 30' provided with a scale which cooperates with an adjusting mark provided on the arm 28'. The other end of the shaft 29' carries a worm 31' which is in engagement with a worm-wheel sector 32' mounted on the guide lever 27' in such manner that the angular position of the guide lever 27' on the shaft 19' can be varied by turning the milled head 31' together with the shaft 29'. The pin 34' is mounted on a guide member which is adapted to be displaceable in a slide provided in the support 39' by means of a screw-threaded spindle 37' which is mounted in the support 39' so as to be nondisplaceable in the axial direction, and is secrewed into an internal thread provided in the said guide member. For adjustment of the guide member, the upper end of the screw-threaded spindle 37' is provided with a milled head 38' provided with a scale which corresponds to an adjusting mark provided on the support 39'. The sliding member 36 which, in the left-hand half of the plotting apparatus, is inserted between the guide member and the support 39, and the lower end of which is supported by one arm of the lever 40, and all those parts cooperating with the lever 40, do not occur in the right-hand half of the plotting apparatus. Furthermore, the guide lever 49' in the right-hand half of the plotting apparatus is mounted securely on the shaft 22' and, therefore, an adjusting means corresponding to the arm 50 with the shaft 51, its milled head 52, its worm 53, and the worm-wheel sector 54 of the guide lever 49 provided in the left-hand half of the plotting apparatus do not occur in the right-hand half. The guide member 57' on which the pin 56' engaging in the guide slot 55' of the guide lever 49' is mounted, is, however, guided so as to be vertically displaceable in a sliding member 58'. The displacement of the guide member 57' in the sliding member 58' is effected by a screw-threaded spindle 59' which is axially non-displaceable in the sliding member 58', and is screwed into an internal thread provided in the guide member 57', its upper end carrying a milled head 60' provided with an adjusting scale which corresponds to an adjusting mark provided on the sliding member 58'. The sliding member 58' is displaceable in a vertical slide provided in the support 61' mounted on the sliding carriage 8'. The lower end of the sliding member 58' slides on a guide rod 62' extending in the direction of x parallel to the plane of the box frame 1, and secured to two levers 63' provided on a shaft 64' mounted on the guide rod 6. At the end disposed close to the side part of the box frame 1 nearest to it, the guide rod 62' carries a guide roller 65' which runs on a guide rail 66' extending in the direction of y. The guide rail 66' is mounted on a shaft 67' on the sliding carriage 5', so that its angle of inclination can be adjusted. For adjustment of the angle of inclination of the guide rail 66', there is mounted securely on the support 39' an internally threaded member 68' into which is screwed an adjusting screw 69', the head of which is provided with a scale which cooperates with an adjusting mark provided on the internally threaded member 68'. The end of the adjusting screw 69' acts on one arm of an angle lever 70' which is mounted on the support 39', and the other arm of which acts on a pin 71' which is provided on the guide rail 66'.

In order to allow for the tilt of the aerial photographs 9 and 9' with respect to the base of survey, the frames 10 and 10' of the aerial photograph 9 and 9' are respectively provided with adjusting devices 73 and 73' which are provided with a scale, and by means of which, through spindles 74 and 74', the worms 75 and 75' and toothed segments 76 and 76' provided on the frames 10 and 10' and meshing with the worms 75 and 75', the frames 10 and 10' can respectively be turned on the sliding carriages 8 and 8'.

In the plotting of the aerial photographs 9 and 9', the space point of the model is displaced by the displacement of the base carriage 14. This has the following effect on the left-hand half of the plotting apparatus:

The components of displacement in the direction of x are converted by the stereoscopic model guide 15 into rotational movements of the shaft 22, the components of displacement in the direction of y being converted into rotational movements of the shaft 19. These converted rotational movements in the form of displacements in the direction of x are transmitted to the sliding carriage 8, and thus to the aerial photograph 9, by the shaft 22 through the guide lever 49. The converted rotational movements of the shaft 19 in the form of displacements in the direction of y are transmitted through the guide lever 27 to the sliding carriage 5, and thus to the lens-side part of the stereoscope secured thereto and moving together therewith, this part of the stereoscope containing the measuring mark 13. Upon displacement of the sliding carriage 5, the transmitting member 45 slides on the guide rod 42, which is secured to one arm of the two-armed lever 40 and to the lever 43. The lower end of the sliding member 36, in which the guide member with the pin 34 engaged by the guide lever 27 is provided, is supported by the other arm of the two-armed lever 40. The position of the guide rod 42 in the vertical sense, is, however, varied by displacement of the sliding carriage 8 in the direction of x by the transmitting member 45 which slides on the inclined guide rail 46 of the sliding carriage 8 with the result that the sliding member 36 is displaced in the support 39, so that the level of the pin 34 engaged by the guide lever is varied. On the right-hand side of the plotting apparatus the result is as follows:

The components of displacement of the space point of the model, that is, of the base carriage 14, in the directions of x and y are converted by the stereoscopic model guide 15' in a similar manner into rotational movements of the shafts 22' and 19'. The level of the pin 34' remains, however, unaffected by the displacement of the sliding carriage 8' in the direction of x, since the guide member on which the pin 34' is mounted retains its adjusted level rather than being displaced in the support 39'. Upon displacement of the sliding carriage 8', however, the sliding member 58', in which slides the guide member 57', the pin 56' of which is engaged by the guide lever 49', slides on the horizontal guide rod 62'. The level of the guide rod 62 is, however, varied by displacement of the sliding carriage 5' in the direction of y by the guide roller 65' which runs on the inclined guide rail 66', on the sliding carriage 5', with the result that the sliding member 58', in which the guide member 57' with its pin 56' is held in position, is displaced in the support 61' provided on the sliding carriage 8', so that the level of the pin 56' which is engaged by the guide level 49', is varied.

Thus, the deviations included in Groups 1a and 1b can be allowed for in the first step of correction by adjusting the angle of inclination of the plane of projection, and the deviations included in Group 1c, can be corrected by adjusting the level of the pins 34 and 56', which are engaged by the guide levers 27 and 49' respectively, by means of the milled heads 38 and 69'.

The additional variation of the effective lengths of the levers produced by the guide rails 46 and 66' respectively which have been tilted with the aid of the adjusting screws 48 and 69', resulting in small displacements of the sliding members 36 and 58' upon movement of the sliding carriages 5' and 8, is the second correcting step in which the deviations included in the second group can be allowed for.

I claim:

1. An apparatus in two halves for the photogrammetric plotting of stereometrically associated aerial photographs in pairs, comprising a box frame, a plurality of adjustable screw legs supporting said frame, two pairs of guide rods securely attached on said frame so as to extend parallel to the sides thereof, a sliding carriage movably provided on each pair of said guide rods, two guide members mounted securely on said frame and extending at right angles to said guide rods, two frame-like sliding carriages movably mounted on said guide members so as to be displaceable independently of each other, said frame-like sliding carriages serving as carriers for one of said stereometricaly associated aerial photographs, each half of said apparatus having at least one stereoscopic model guide means, two shafts each mounted at right angles on each half of said apparatus, and a guide lever secured to each of said shafts, the angular position of at least one of said guide levers being adjustable with respect to its associated stereoscopic model guide means prior to the plotting operation, said stereoscopic model guide means transmitting deviations during the plotting of the aerial photographs in the form of independent rotational movements to said two shafts intersecting at right angles, the guide levers transmitting the rotational movements of the said shafts independently of each other in the form of relative movements between the carriers of the aerial photographs and their associated carriers of the measuring marks in the direction of $x$ and $y$.

2. A photogrammetric plotting apparatus according to claim 1, further having sliding members, a guide member adjustably mounted in each of said sliding members by means of a screw threaded spindle, and a pin secured in each of said guide members, in which at least one of the guide levers by which the rotational movements of the said shafts in the form of relative movements between the carriers of the aerial photographs and their associated carriers of the measuring marks are transmitted in the directions of $x$ and $y$, engages said pin, one of the sliding carriages carrying a measuring mark and the other sliding carriage carrying one of the aerial photographs, means displacing said sliding members in their respective slides provided in the supports by separate control mechanisms in dependence upon the adjusted angle of inclination of each guide rail, in such manner that the sliding member of the sliding carriage which is displaceable in the direction of $y$ undergoes additional displacements in dependence upon the movement of the sliding carriage which is displaceable in the direction of $x$, and in dependence upon the adjusted angle of inclination of the guide rail, the sliding member of the sliding carriage which is displaceable in the direction of $x$, undergoing additional displacements in dependence upon the movement of the sliding carriage which is displaceable in the direction of $y$ and in dependence upon the angle of inclination of the guide rail adjusted.

References Cited in the file of this patent

UNITED STATES PATENTS

| | | |
|---|---|---|
| 2,636,416 | Platt | Apr. 28, 1953 |
| 2,647,318 | Grondona | Aug. 4, 1953 |
| 2,803,992 | Baboz | Aug. 27, 1957 |
| 2,847,906 | Santoni | Aug. 19, 1958 |
| 2,938,428 | Nistri | May 31, 1960 |

FOREIGN PATENTS

| | | |
|---|---|---|
| 1,118,570 | France | Mar. 19, 1956 |
| 764,449 | Great Britain | Dec. 28, 1956 |